(12) United States Patent
Tatsuno

(10) Patent No.: US 11,472,007 B2
(45) Date of Patent: Oct. 18, 2022

(54) IMPACT TORQUE GENERATOR FOR HYDRAULIC POWER WRENCH

(71) Applicant: URYU SEISAKU LTD., Osaka (JP)

(72) Inventor: Koji Tatsuno, Osaka (JP)

(73) Assignee: URYU SEISAKU LTD., Osaka (JP)

( * ) Notice: Subject to any disclaimer, the term of this patent is extended or adjusted under 35 U.S.C. 154(b) by 1087 days.

(21) Appl. No.: 16/114,974

(22) Filed: Aug. 28, 2018

(65) Prior Publication Data
US 2019/0061116 A1    Feb. 28, 2019

(30) Foreign Application Priority Data

Aug. 31, 2017  (JP) .............................. JP2017-167076
Aug. 6, 2018   (JP) .............................. JP2018-147889

(51) Int. Cl.
*B25B 21/02*    (2006.01)
*B25F 5/00*     (2006.01)
*F16D 5/00*     (2006.01)
*B25B 23/145*   (2006.01)

(52) U.S. Cl.
CPC .............. *B25B 21/02* (2013.01); *B25F 5/005* (2013.01); *F16D 5/00* (2013.01); *B25B 23/1453* (2013.01)

(58) Field of Classification Search
CPC ..... B25B 21/02; B25B 23/1453; B25F 5/005; F16D 5/00
See application file for complete search history.

(56) References Cited

U.S. PATENT DOCUMENTS 4,553,948 A * 11/1985 Tatsuno ................. B25B 21/02
                                              464/25
4,785,693 A * 11/1988 Minamiyama .......... B25B 21/02
                                              464/25
(Continued)

FOREIGN PATENT DOCUMENTS

EP    0 185 639    6/1986
EP    0 676 260    10/1995
(Continued)

OTHER PUBLICATIONS

Extended European Search Report dated Feb. 1, 2019 in European Patent Application No. 18191281.7.
(Continued)

*Primary Examiner* — Andrew M Tecco
*Assistant Examiner* — Nicholas E Igbokwe
(74) *Attorney, Agent, or Firm* — Wenderoth, Lind & Ponack, L.L.P.

(57) ABSTRACT

An impact torque generator for a hydraulic torque wrench includes a liner, a main shaft, a first drivable blade and a second drivable blade. The liner has two sealing surfaces defined at a position of 180 degree rotational symmetry. For each of the first drivable blade and the second drivable blade, a first sealing surface of the drivable blade is configured to be in contact with one of the sealing surfaces of the liner while a second sealing surface of the drivable blade slides in contact with an inner peripheral surface of the liner so as to create a seal such that a portion of an interior of the liner is divided into a high-pressure chamber and a low-pressure chamber so as to generate impact torque on the main shaft.

5 Claims, 21 Drawing Sheets

(56) References Cited

U.S. PATENT DOCUMENTS

| | | | | |
|---|---|---|---|---|
| 5,080,180 A | * | 1/1992 | Hansson | B25B 21/02 |
| | | | | 192/17 D |
| 5,429,553 A | * | 7/1995 | Schoeps | B25B 21/02 |
| | | | | 464/25 |
| 5,741,186 A | * | 4/1998 | Tatsuno | B25B 21/02 |
| | | | | 81/463 |
| 5,890,848 A | * | 4/1999 | Kachich | B23Q 17/09 |
| | | | | 408/1 R |
| 2012/0240418 A1 | * | 9/2012 | Gatten | B23D 61/123 |
| | | | | 30/392 |
| 2015/0096776 A1 | * | 4/2015 | Garber | B25C 1/00 |
| | | | | 173/1 |

FOREIGN PATENT DOCUMENTS

| | | |
|---|---|---|
| EP | 1 223 007 | 7/2002 |
| EP | 3 450 106 | 11/2020 |
| JP | 54-62504 | 5/1979 |
| JP | 54-77203 | 6/1979 |
| JP | 57-10786 | 1/1982 |
| JP | 7-328944 | 12/1995 |
| JP | 2004-36580 | 2/2004 |

OTHER PUBLICATIONS

Notification of Reasons for Refusal dated Feb. 21, 2020 in Japanese Patent Application No. 2018-147889, with Machine Translation.

* cited by examiner 14a,14b 14a,14b

Fig. 4a
Fig. 4b
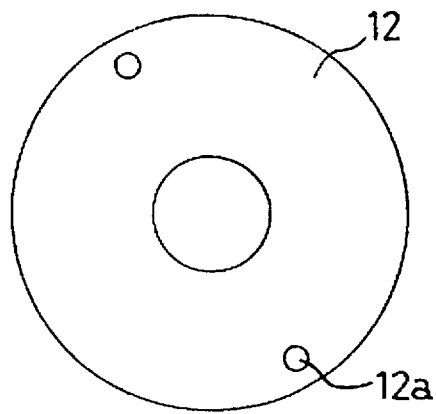
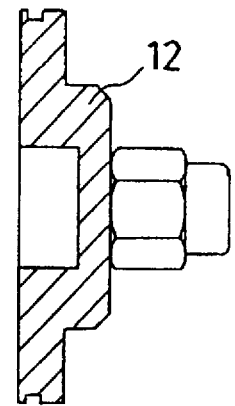

Fig. 5a
Fig. 5b
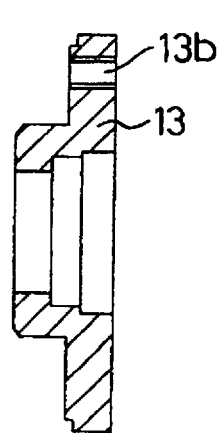
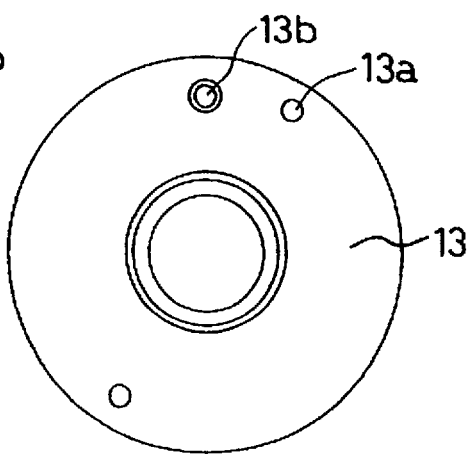

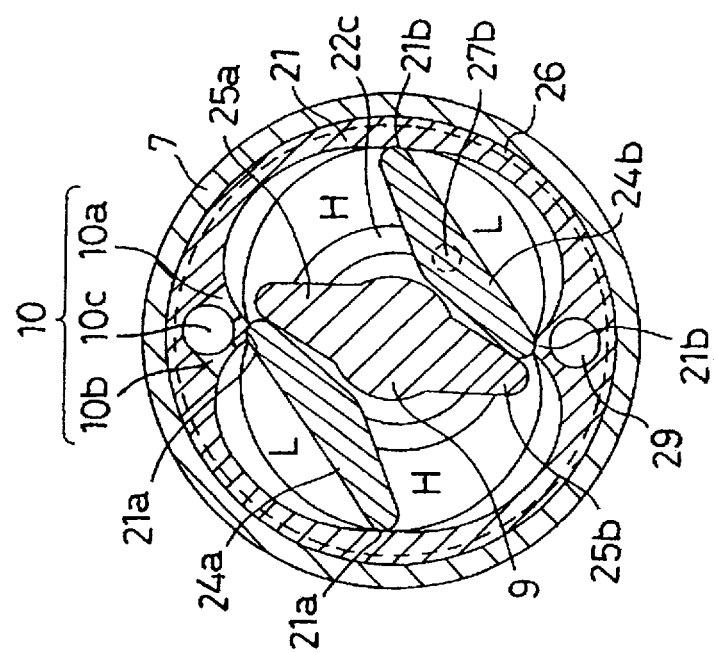
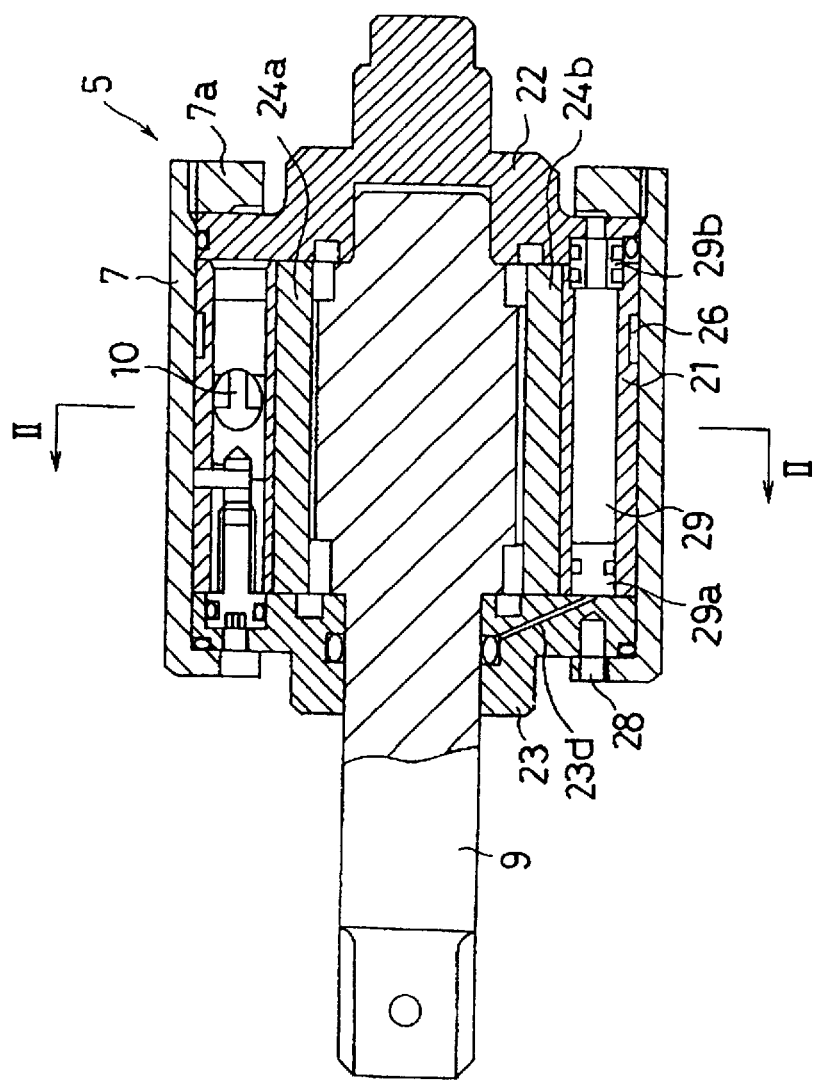

Fig. 10a
Fig. 10b
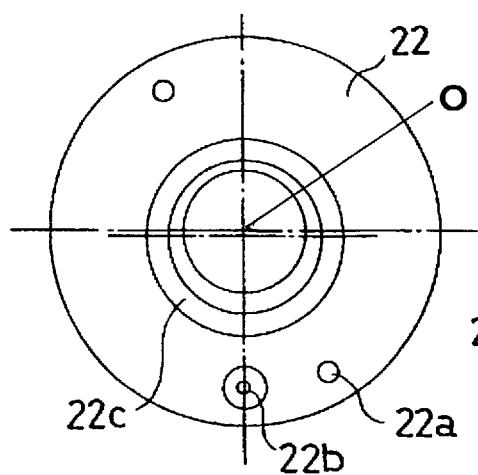
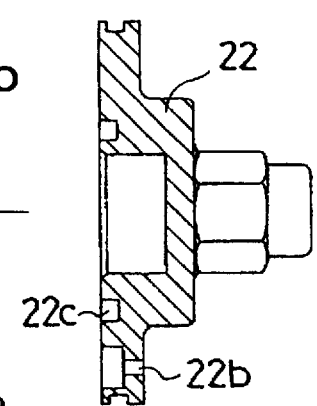

Fig.20
(Driving blade symmetrical shape)
Tool vertical direction 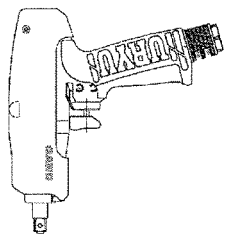 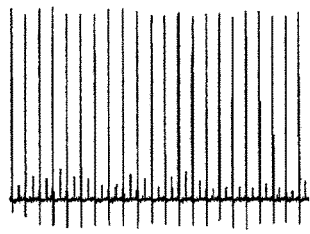
Torque waveform
Tool horizontal direction  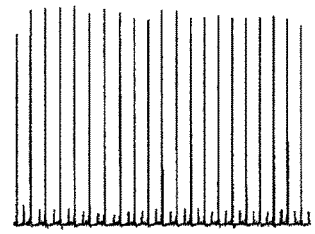
(Driving blade asymmetrical shape)
Tool vertical direction 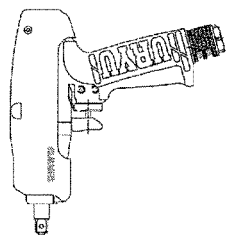 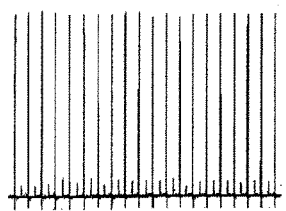
Tool horizontal direction 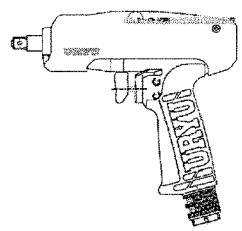 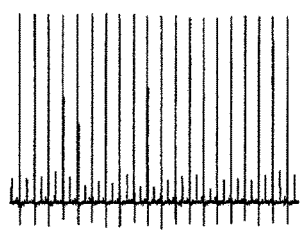

IMPACT TORQUE GENERATOR FOR HYDRAULIC POWER WRENCH

ART FIELD

This invention concerns impact torque generator for hydraulic power wrench.

BACKGROUND ART

As an impact torque generator for torque wrench, a hydraulic torque wrench using hydraulic impact torque generator with less noise and less vibration has been developed and practically used. FIG. 21 shows an example of this hydraulic torque wrench, and the main body 1 of this hydraulic torque wrench has main valve 1 to supply/stop high-pressure air and normal/reverse rotation selector valve 3 to selectively generate the impact torque of normal/reverse rotation, and drives rotor 4 to generate rotating torque by means of high-pressure air sent from these valves 2 and 3.

And the hydraulic impact torque generator 5 to convert the rotating torque of the rotor 4 into impact torque is provided in the front case 6 installed at the tip of the main body 1 of hydraulic torque wrench. This hydraulic impact torque generator 5 has liner 8 provided in liner case 7, and in this liner 8 hydraulic fluid is filled and sealed, and main shaft 9 coaxially installed in the liner 8 is provided with one or multiple blade inserting grooves, and in this blade inserting groove blade B is installed, and this blade B is always pushed in the outer peripheral direction by spring S to contact the inner peripheral surface of the liner 8, and on the outer peripheral surface of the main shaft 9 one or multiple sealing surfaces are formed. The liner 8 is provided with output adjusting mechanism 10 to adjust the size of the impact torque. By rotating the liner 8 by the rotor 4, and when the multiple sealing surfaces formed on the inner peripheral surface of the liner 8 are brought into coincidence with the sealing surfaces formed on the outer peripheral surface of the main shaft 9 and the blade B, the impact torque is generated on the main shaft 9.

In case of the conventional impact torque generator for hydraulic torque wrench, by the way, since it adopted such configuration that the main shaft 9 is provided with one or multiple blade inserting grooves, and in this blade inserting groove, blade B is installed, and this blade B is always pushed in the outer peripheral direction of the main shaft by spring S to contact the inner peripheral surface of the liner 8, it had such problems that due to the sliding resistance between the tip of the blade B and inner peripheral surface of the liner 8, energy loss is large, the temperature of the hydraulic fluid increased due to the heat of friction generated by the sliding and due to the viscosity change of the hydraulic fluid, the output of torque wrench fluctuated. Since it is necessary to provide the main shaft 9 with blade inserting grooves and hole to insert the spring S, the diameter of the main shaft 9 must be made larger to maintain the strength of the main shaft 9 and the equipment itself is made larger accordingly and the structure of the equipment becomes complicated, and durability of the equipment had durability problem such as damage of the spring S.

To cope with this problem, this applicant proposed an impact torque generator for hydraulic torque wrench, which is small, simple in structure and durable featuring less sliding resistance, good energy efficiency, and stable output with less temperature rise of the hydraulic fluid, by eliminating the blade B to be always pushed in the outer peripheral direction of the main shaft by the spring S (see JP 07-328944 A (1995)).

OUTLINE OF INVENTION

Problems to be Solved by the Invention

The basic structure of this hydraulic torque wrench itself is same as that of the conventional hydraulic torque wrench shown in FIG. 21, and the hydraulic torque wrench has main valve 2 to supply/stop high-pressure air and normal/reverse rotation selector valve 3 to selectively generate the impact torque of normal/reverse rotation, and drives rotor 4 to generate the rotating torque by means of the high-pressure air sent by these valves 2 and 3. And it has the impact torque generator 5 to convert the rotating torque of the rotor 4 into the impact torque provided in the front case 6 installed at the tip of the main body 1 of the hydraulic torque wrench.

The hydraulic impact torque generator 5, as shown in FIGS. 1*a*-6*c*, has liner 11 in the liner case 7, and in the liner 11, hydraulic fluid is filled and sealed, and the main shaft 9 is coaxially installed in the liner 11.

In the liner 11 with the main shaft 9 installed in it, an approximately elliptical cavity is formed, and on its inner peripheral surface, 4 sealing surfaces 11*a* and 11*b*, a set of 2 pieces, are angularly formed, and the sealing surfaces of this one set of 2 pieces, or sealing surfaces 11*a* and 11*b* are formed at the position of 180° rotational symmetry. This cylindrical liner 11 is supported on its outer periphery by the liner case 7, and at both ends of the liner 11, liner upper cover 12 and liner lower cover 13 are arranged, and the liner 11 and the liner upper cover 12 and liner lower cover 13 are integrally rotated by inserting knock pin 17 in the pin hole provided in the liner 11 and pin holes 12*a* and 13*a* provided respectively in the liner upper cover 12 and liner lower cover 13. And the liner upper cover 12 is further fixed axially by the liner case 7*a*, thus sealing the hydraulic fluid filled inside the liner 11.

For the main shaft 9 coaxially installed inside the liner 11, 2 projections 15*a* and 15*b* with the surface smoothed are formed at the position of 180° rotational symmetry.

For these two projections 15*a* and 15*b* of the main shaft 9, the length in both axial and peripheral directions is formed shorter than the cavity inside the liner 11, thereby forming a passage to flow the hydraulic fluid at both ends in the axial direction and at the tip in peripheral direction.

In the cavity formed inside the liner 11 and set by projections 15*a* and 15*b* of the main shaft 9, 2 sectional approximately triangular driving blades 14*a* and 14*b* of same size with the surface smoothed are installed. For these two driving blades 14*a* and 14*b*, the axial length is made almost same length as that of the cavity inside the liner 11 so that the side faces of the driving blades 14*a* and 14*b* will slide in contact with the inner surfaces of the liner upper cover 12 and liner lower cover 13, and near at both end portions of them, sealing surfaces to correspond to the sealing surfaces 11*a* and 11*b* of the liner 11 are formed so that the sealing surfaces 11*a* and 11*b* of the liner 11 are brought into coincidence with the sealing surfaces of the driving blades 14*a* and 14*b* twice per rotation of the liner 11.

On the outer peripheral surface of the liner 11, a communicating groove 16 to mutually connect the cavities to become low-pressure room L inside the liner 11 set by the driving blades 14*a* and 14*b* and the sealing surfaces 11*a* and 11*b* of the liner 11.

The liner 11 is provided with output adjusting mechanism 10 to adjust the size of the impact torque in parallel with the shaft center of the liner 11. This output adjusting mechanism 10 is conventionally known, and consists of ports 10a and 10b to connect cavities inside the liner 11 to become high-pressure room H and low-pressure room L, set by the driving blades 14a and 14b and sealing surfaces 11a and 11b of the liner 11, and output adjusting valve 10c adjustably and spirally set to the tapped hole 13b provided in the liner lower cover 13.

The operation of this impact torque generator 5 for hydraulic torque wrench is explained as follows. First the high-pressure air is introduced into the rotor room in the main body 1 by operating the main valve 2 and selector valve 3, and then the rotor 4 rotates at high speed. The rotary force of this rotor is transferred to the liner 11.

Through the rotation of the liner 11, the inside of the liner case 7 changes as shown in FIG. 6a→6b→6c→6d→6a. FIG. 6a indicates the state of the impact torque not generated on the main shaft 9, and from this state, the liner 11 rotates approximately 90° each time and the changes are shown in FIGS. 6b-6d.

The impact torque is generated on the main shaft 9 as shown in FIG. 6b and FIG. 6d, and the sealing surfaces 11a and 11b of the liner 11 and the sealing surfaces of the driving blades 14a and 14b are brought into coincidence and the cavity in the liner 11 is divided into 4 rooms, and because of the shape of the cavity in the liner 11, the moment when the impact torque occurs on the main shaft 9, the volume on the side of high-pressure room H decreases and the volume on the side of low-pressure room L increases, and the rooms become high-pressure room H and low-pressure room L, respectively. That is, the liner 11 is rotated by the rotor 4, and when the sealing surfaces 11a and 11b of the liner 11 and sealing surfaces of the driving blades 14a and 14b come to the position of coincidence, the rooms become high-pressure room H and low-pressure room L, respectively, and by the driving blades 14a and 14b being pushed to the side of low-pressure room L, the sealing surfaces 11a and 11b and the sealing surfaces of the driving blades 14a and 14b are brought into coincidence, and the cavity inside the liner 11 is completely sealed, and via the driving blades 14a and 14b, the rotating force of the liner 11 acts on the projections 15a and 15b, thus generating the impact torque on the main shaft 9. Then the main shaft 9 is rotated by the impact torque which occurs intermittently, twice per rotation of the liner 11, thus performing such desired work as tightening and loosening of bolts and nuts.

As shown in FIG. 6a and FIG. 6c, on the other hand, when the sealing surfaces 11a and 11b of the liner 11 and sealing surfaces of the driving blades 14a and 14b come to the position of coincidence, the rooms instantly become high-pressure room H and low-pressure room L, but by the driving blades 14a and 14b being pushed to the side of low-pressure room L, no coincidence occurs between the sealing surfaces 11a and 11b of the liner 11 and the sealing surfaces of the driving blades 14a and 14b and the cavity inside the liner 11 is not sealed and the hydraulic fluid on the side of high-pressure room H flows to the side of low-pressure room L through the clearance between both sealing surfaces, and therefore, no impact torque is generated.

If the rotor is rotated in the opposite direction, the inside of the liner case 7 changes as shown in FIG. 6d→6c→6b→6a→6d, thus making it possible to generate the impact torque in the reversed direction on the main shaft 9.

Here although the basic structure is same as the above example, the hydraulic impact torque generator 5 can be composed as shown in FIGS. 7a to 12d.

With this hydraulic impact torque generator 5, liner 21 is provided in the liner case 7 and hydraulic fluid is filled and sealed in this liner 21 and main shaft 9 is coaxially installed in the liner 21.

In the liner 21 with the main shaft 9 installed in it, an approximately elliptical cavity is formed and on its inner peripheral surface, four sealing surfaces 21a and 21b, one set of two pieces, are angularly formed, and sealing surfaces of this one set of two pieces, or the sealing surfaces 21a and 21b are formed at the position of 180 degree rotational symmetry. This cylindrical liner 21 is supported at its outer periphery by the liner case 7 and at both ends of the liner 21, the liner upper cover 22 and the liner lower cover 23 are arranged, and the liner 21 and the liner upper cover 22 and the liner lower cover 23 are integrally rotated by inserting a knock pin (not illustrated) in the pin hole provided in the liner 21 and pin holes 22a and 23a provided in the liner upper cover 22 and the liner lower cover 23. The liner upper cover 22 is further axially fixed by the liner case cover 7a to seal the hydraulic fluid filled in the liner 21. On the inner surfaces of the liner upper cover 22 and the liner lower cover 23, guide grooves 22c and 23c are formed eccentric to the rotating shaft O of the liner 21 in such a way that an eccentric direction will be 180 degree rotating symmetry. In the liner lower cover 23, a pin hole 23e and a hydraulic fluid injection hole 23f are formed. In the pin hole 23e, a pin 28 to pass through the liner case 7 is inserted to prevent the liner case 7 and the liner lower cover 23 from turning.

On the main shaft 9 coaxially installed inside the liner 21, two projections 25a and 25b with the surface smoothed are formed at the position of 180 degree rotational symmetry. For these two projections 25a and 25b, the length in both axial and circumferential directions is made shorter than the cavity inside the liner 21, thereby forming a passage to flow the hydraulic fluid at both ends of the axial direction and at the end of circumferential direction.

In the cavity set by the projections 25a and 25b of the main shaft 9 formed inside the liner 21, two driving blades 24a and 24b of same size, approximately triangle in section, with the surface smoothed, are installed. For these two driving blades 24a and 24b, the length in the axial direction is made about the same length of the cavity inside the liner 21 so that the side surface of the driving blades 24a and 24b will slide in contact with the inner surface of the liner upper cover 22 and liner lower cover 23, and near at both ends of them, sealing surfaces to correspond to the sealing surfaces 21a and 21b of the liner 21 are formed and on one side of the driving blades, pins 27a and 27b to be installed in the guide grooves 22c and 23c formed on the inner surfaces of the liner upper cover 22 and liner lower cover 23 are formed, and pin 27b of the driving blade 24b and pin 27a of the driving blade 24a are installed in the guide groove 22c of the liner upper cover 22 and in the guide 23c of the liner lower cover 23, respectively, and when the sealing surfaces of the liner 21 and the sealing surfaces of the driving blades 24a and 24b come to coincide twice per rotation of the liner 21, the movement of the driving blades 24a and 24b is restricted once by the pins 27a and 27b of the driving blades 24a and 24b installed in the guide grooves 22c and 23c formed eccentric to the rotating shaft O of the liner 21 on the inner surface of the liner upper cover 22 and liner lower cover 23, thereby preventing the coincidence and thus generating the impact torque on the main shaft once per rotation of the liner 21.

The outer peripheral surface of the liner 21 is provided with communicating groove 26 to mutually connect the cavities to become the low-pressure room L inside the liner 21 set by the driving blades 24a and 24b and sealing surfaces 21a and 21b.

The liner 21 is provided with output adjusting mechanism 10 to adjust the size of the impact torque in parallel with the shaft center of the liner 21. This output adjusting mechanism 10 is conventionally known and consists of ports 10a and 10b to connect the cavities to become high-pressure room H and low-pressure L inside the liner 21 set by the driving blades 24a and 24b and the sealing surfaces 21a and 21b and output adjusting valve 10c to be adjusted through operating hole 23b provided in the liner lower cover 23.

Also, the liner 21 is provided with accumulator 29 to absorb thermal expansion of the hydraulic fluid in parallel with the shaft center of the liner 21. This accumulator 29 is composed of piston 29a and ventilating member 29b, and one end face of the piston 29a is connected to the cavity inside the liner 21 via small hole 23d for accumulator installed in the liner lower cover 23 and the other end face is connected to the atmosphere via the ventilating member 29b, the small hole 22b installed in the liner upper cover 22 and clearance between the liner upper cover 22 and liner case cover 7a.

The operation of this impact torque generator 5 for hydraulic torque wrench is explained as follows. First, when the main valve 2 and selector valve 3 are operated to introduce high-pressure air into the rotor 4, the rotor 4 rotates at high speed. The rotating force of this rotor is transferred to the liner 21.

Through the rotation of the liner 21, the inside of the liner case 7 is changed as shown in FIG. 12a→12b→12c→12d→12a. FIG. 12a indicates the state where no impact torque is generated on the main shaft 9, and from this state the liner rotates about 90 degrees each time as shown in FIGS. 12b to 12d.

The impact torque is generated on the main shaft 9 as shown in FIG. 12b, and the sealing surfaces 21a and 21b of the liner 21 and sealing surfaces of driving blades 24a and 24b are brought into coincidence and the cavity inside the liner 21 is divided into 4 rooms, and because of the shape of the cavity inside the liner 21, the moment when the impact torque is generated on the main shaft, the volume on the side of high-pressure room decreases and the volume on the side of low-pressure room L increases and the rooms become the high-pressure room H and low-pressure room L, respectively. That is, the liner 21 is rotated by the rotor 4, and when the sealing surfaces 21a and 21b of the liner 21 and sealing surfaces of the driving blades come to the position of coincidence, the rooms become high-pressure room H and low-pressure room L, and by the driving blades 24a and 24b being pushed to the side of the low-pressure room L, the sealing surface 21a and 21b of the liner and the sealing surfaces 24a and 24b are brought into coincidence and the cavity inside the liner 21 is completely sealed and the rotating force of the liner 21 acts on the projections 25a and 25b of the main shaft 9 via the driving blades 24a and 24b and generates the impact torque on the main shaft. Then, by the impact torque intermittently generated, once per rotation of the liner 21, the main shaft 9 is rotated to perform desired work such as tightening and loosening of bolts and nuts.

As shown in FIG. 12d, the sealing surfaces of the liner 21 and the sealing surfaces of the driving blades 24a and 24b come to coincide, but at that time, the movement of the driving blades 24a and 24b is restricted by the pins 27a and 27b of the driving blades 24a and 24b inserted in the guide grooves 22c and 23c formed eccentric to the rotating shaft O of the liner 21 on the inner face of the liner upper cover 22 and liner lower cover 23, and therefore, the cavity inside the liner 21 is not sealed and no impact torque is generated on the main shaft 9.

Also, as shown in FIG. 12a, when the sealing surfaces 21a and 21b of the liner 21 and the sealing surfaces of the driving blades 24a and 24b come to the position of coincidence, the rooms momentarily try to become the high-pressure room H and low-pressure room L, but by the driving blades 24a and 24b being pushed to the side of low-pressure room L, the sealing surfaces 21a and 21b of the liner 21 and the sealing surfaces of the driving blades 24a and 24b do not coincide and the cavity inside the liner 21 is not sealed and the hydraulic fluid on the side of high-pressure room H flows to the side of low-pressure room L through the clearance between both sealing surfaces, and therefore, the impact torque does not occur on the main shaft 9.

If the rotor 4 is rotated in the opposite direction, the inside of the liner case 7 changes as shown in FIG. 12d→12c→12b→12a→12d, the impact torque in reversed direction can be generated on the main shaft 9.

Since the hydraulic impact torque generator 5 shown in FIG. 1a to FIG. 6d and FIG. 7a to FIG. 12d does not require the blade always pushed in the outer peripheral direction of the main shaft by the spring, which was indispensable for the conventional impact torque generator 5 for hydraulic torque wrench described in FIG. 21, it has such an advantage that it is possible to obtain a small and durable impact torque generator for hydraulic torque wrench, simple in structure, featuring small sliding resistance, good energy efficiency, small temperature rise of the hydraulic fluid, and therefore, a possibility of obtaining a stable output.

This invention has the objective of providing an impact torque generator for hydraulic torque wrench, simpler in structure, durable, small in sliding resistance and better in energy efficiency, by improving the hydraulic impact torque generator 5 described in FIG. 1a to FIG. 6d and FIG. 7a to FIG. 12d.

Means to Solve the Problems

In order to achieve the above objective, the impact torque generator for hydraulic torque wrench of this invention is equipped with cavity to be filled inside with hydraulic fluid and has liner to be rotated by a rotor forming sealing surfaces so as to be projected from the inner peripheral surface of the cavity and two projections and has main shaft coaxially installed inside the liner and sealing surfaces at both end portions and two driving blades installed in the cavity of the liner to be filled with the hydraulic fluid, and by the driving blades the inside of the liner is divided into high-pressure room and low-pressure room, thus generating the impact torque on the main shaft, and such an impact torque generator for hydraulic torque wrench is characterized in that two sealing surfaces of the aforementioned liner are formed at the position of 180 degree rotational symmetry, and then the sealing surface of the liner and one sealing surface of each driving blade are brought into coincidence, the other sealing surface slides in contact with the inner peripheral surface of the cavity to seal, thereby dividing the inside of the liner into high-pressure room and low-pressure room by the driving blade, thus generating the impact torque on the main shaft.

In this case, it is possible to generate the impact torque once on the main shaft per rotation of the liner by arranging steel balls to restrict the movement of the driving blade, inserted in the guide grooves formed in the inner surface of the liner upper cover and liner lower cover on one side of the aforementioned driving blade.

The sealing surface of the aforementioned driving blade can be composed of steel balls arranged in the grooves formed at both ends of the driving blade.

Also, the cross-sectional shape of the aforementioned driving blade can be asymmetrical.

Also, the aforementioned driving blade can be magnetized.

Effect of Invention

According to the impact torque generator for hydraulic torque wrench of this invention, it is equipped with cavity to be filled inside with hydraulic fluid and has the liner to be rotated by the rotor, the liner to be rotated by the rotor with sealing surfaces formed so as to project from the inner peripheral surface of the cavity and two projections, has the main shaft installed coaxially inside the liner, had sealing surfaces at both ends and has two driving blades to be inserted in the cavity of the liner with hydraulic fluid filled in it, and by the driving blade, the inside of the liner is divided into high-pressure room and low-pressure room, thus generating the impact torque on the main shaft, and in such an impact torque generator for hydraulic torque wrench, two sealing surfaces of the aforementioned liner are formed at the position of 180 degree rotational symmetry, and when the sealing surface of the liner and one sealing surface of each driving blade are brought into coincidence, the other sealing surface slides in contact with the inner peripheral surface of the cavity to seal and by the driving blade the inside of the liner is divided into high-pressure room and low-pressure room, thus generating the impact torque on the main shaft, and therefore, the sealing surface to correspond to the other sealing surface of each driving blade can be composed of the inner peripheral surface of the cavity, substantially making it possible to omit the processing process of the cavity of the liner to form this sealing surface, thus making it possible to provide the impact torque generator for hydraulic torque wrench simple in structure and durable.

By arranging steel balls to restrict the movement of the driving blade to be installed in the guide groove formed in the inner surface of the liner upper cover and liner lower cover on the side face on one side of each driving blade, thus generating the impact torque once on the main shaft per rotation of the liner, it is possible to provide an impact torque generator for hydraulic torque wrench featuring small sliding resistance and good energy efficiency.

By composing the sealing surface of the aforementioned driving blade of steel bars arranged in the grooves formed at both ends of the driving blade, it is possible to provide an impact torque generator for hydraulic torque wrench small in sliding resistance and better in energy efficiency.

Also, by making asymmetrical the cross-sectional shape of the aforementioned driving blade, it is possible to improve the stability of the movement of the driving blade when the rotating shaft is used in horizontal direction and obtain stable high output.

By magnetizing the aforementioned driving blade and adsorbing to the driving blade the magnetic powder produced due to abrasion of parts included in the hydraulic fluid, it is possible to prevent the abrasion of parts due to the magnetic powder. It is also possible to easily remove the magnetic powder adsorbed to the driving blade by just wiping the driving blade during maintenance.

BRIEF EXPLANATION OF DRAWINGS

FIG. 4a is a view to show the liner upper cover of the impact torque generator of the same example.

FIG. 4b is a view to show the liner upper cover of the impact torque generator of the same example.

FIG. 5a is a view to show the liner lower cover of the impact torque generator of the same example.

FIG. 5b is a view to show the liner lower cover of the impact torque generator of the same example.

FIG. 7a indicates another example of the impact torque generator for hydraulic torque wrench, showing the front sectional view.

FIG. 7b indicates another example of the impact torque generator for hydraulic torque wrench, showing its II-II cross section.

FIG. 10a is a view to show the liner upper cover of the impact torque generator of the same example.

FIG. 10b is a view to show the liner upper cover of the impact torque generator of the same example.

FIG. 20 is a view to show output waveform of comparison test related to the same modified embodiment.

CONFIGURATION FOR IMPLEMENTING THE INVENTION

Figure 1A:
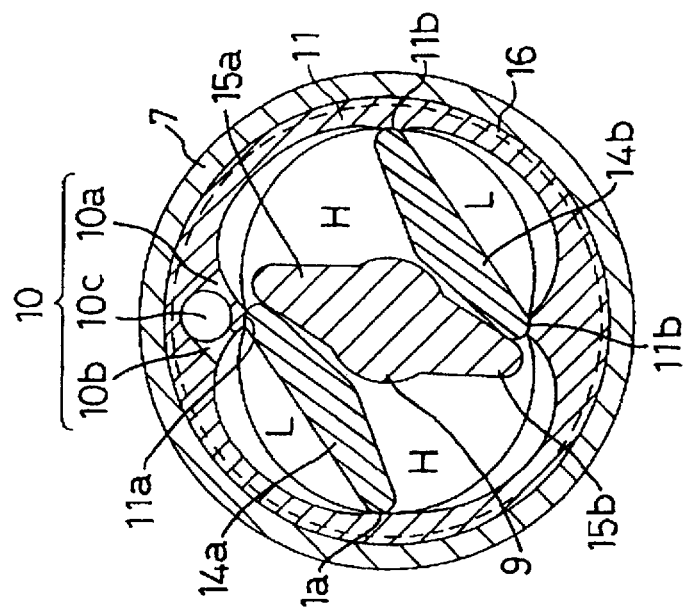
FIG. 1a indicates an example of the impact torque generator for hydraulic torque wrench, showing front sectional view.
Figure 1B:
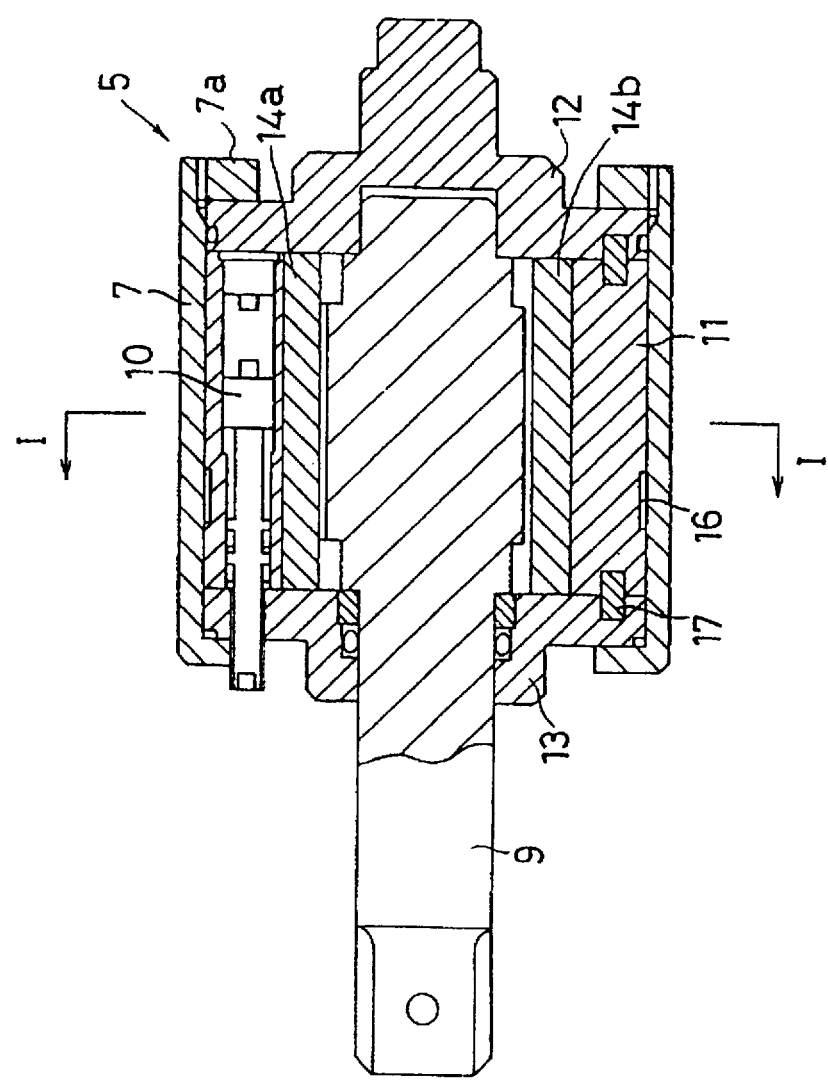
FIG. 1b indicates an example of the impact torque generator for hydraulic torque wrench, showing its I-I cross section.
Figure 2A:
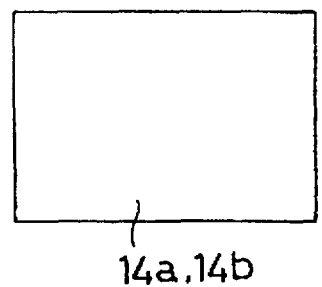
FIG. 2a is a view to show the driving blade of the impact torque generator of the same example.
Figure 2B:
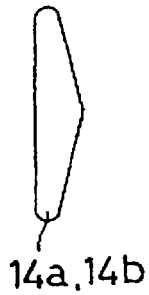
FIG. 2b is a view to show the driving blade of the impact torque generator of the same example.
Figure 3A:
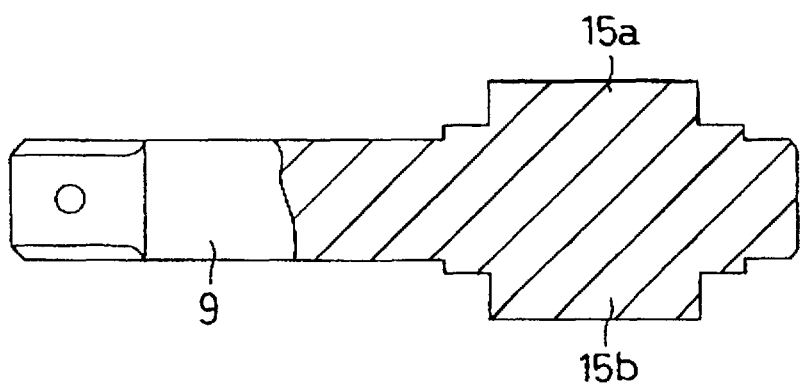
FIG. 3a is a view to show the main shaft of the impact torque generator of the same example.
Figure 3B:
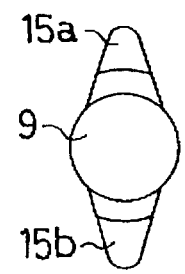
FIG. 3b is a view to show the main shaft of the impact torque generator of the same example.
Figure 6A:
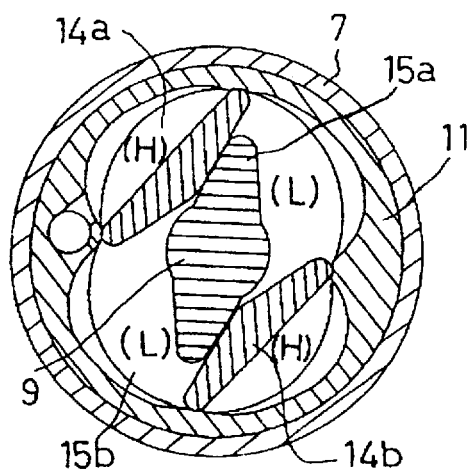
FIG. 6a is a view to show operation of the impact torque generator of the same example.
Figure 6B:
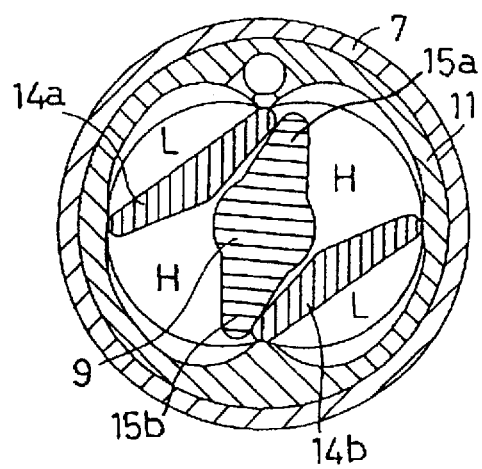
FIG. 6b is a view to show operation of the impact torque generator of the same example.
Figure 6D:
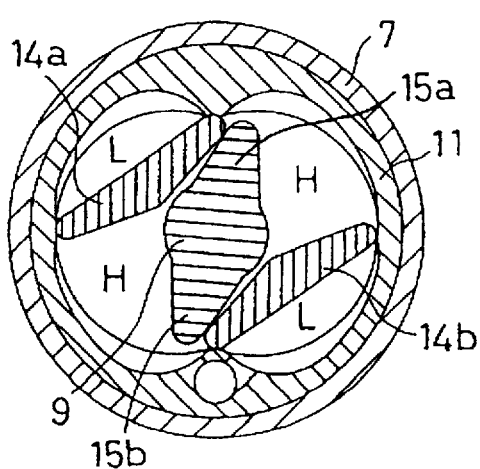
FIG. 6d is a view to show operation of the impact torque generator of the same example.
Figure 6C:
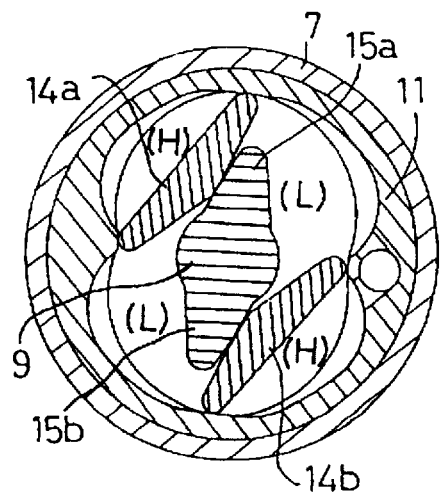
FIG. 6c is a view to show operation of the impact torque generator of the same example.
Figure 8A:
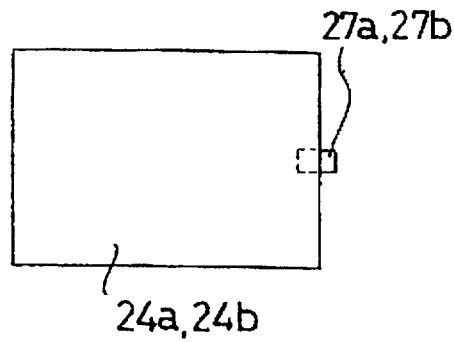
FIG. 8a is a view to show the driving blade of the impact torque generator of the same example.
Figure 8B:
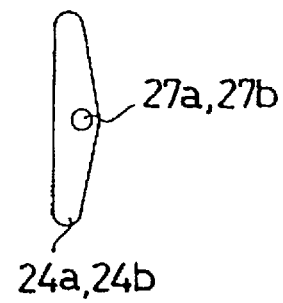
FIG. 8b is a view to show the driving blade of the impact torque generator of the same example.
Figure 9A:
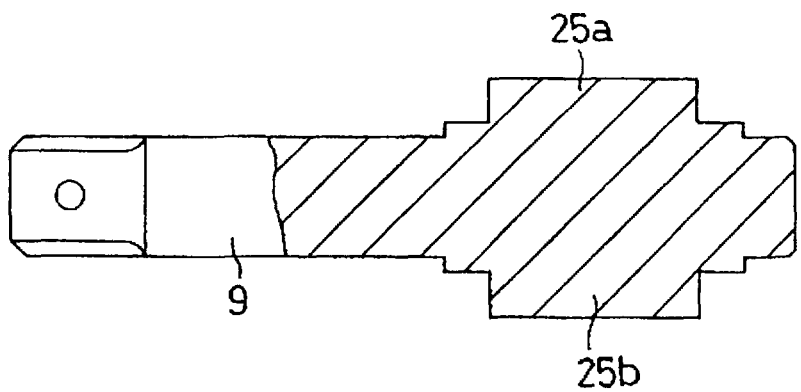
FIG. 9a is a view to show the main shaft of the impact torque generator of the same example.
Figure 9B:
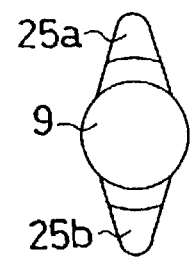
FIG. 9b is a view to show the main shaft of the impact torque generator of the same example.
Figure 11A:
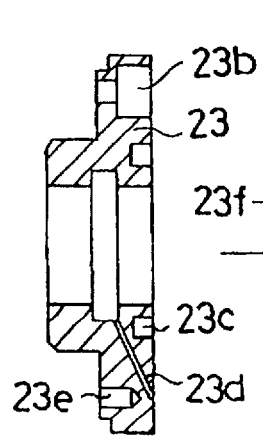
FIG. 11a is a view to show the liner lower cover of the impact torque generator of the same example.
Figure 11B:
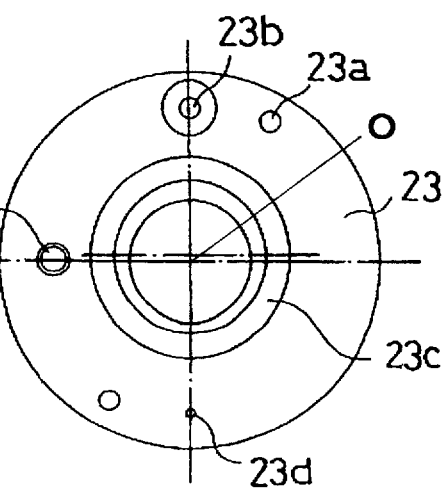
FIG. 11b is a view to show the liner lower cover of the impact torque generator of the same example.
Figure 12A:
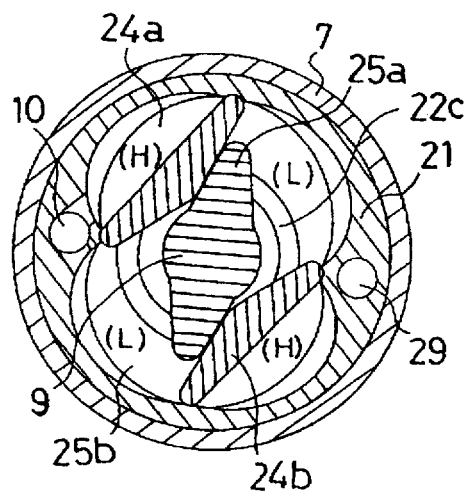
FIG. 12a is a view to show the operation of the impact torque generator of the same example.
Figure 12B:
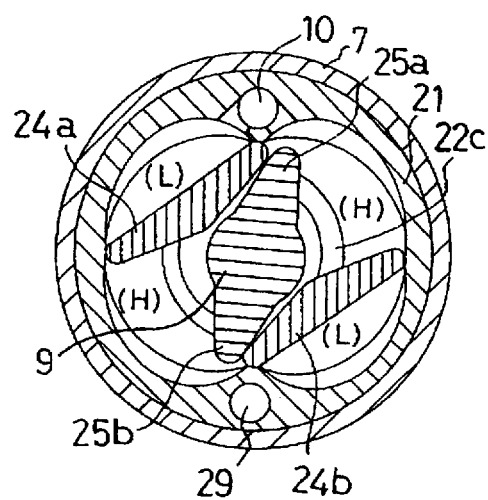
FIG. 12b is a view to show the operation of the impact torque generator of the same example.
Figure 12D:
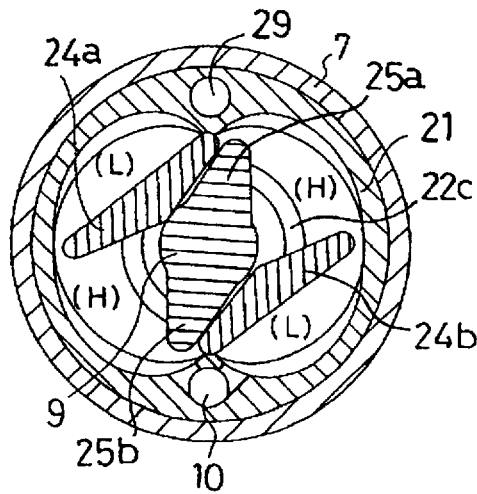
FIG. 12d is a view to show the operation of the impact torque generator of the same example.
Figure 12C:
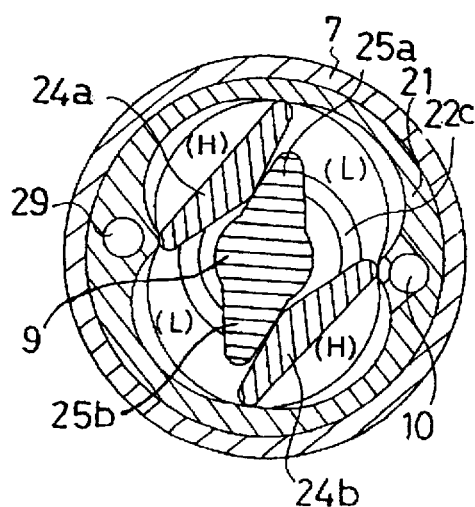
FIG. 12c is a view to show the operation of the impact torque generator of the same example.
Figure 13A:
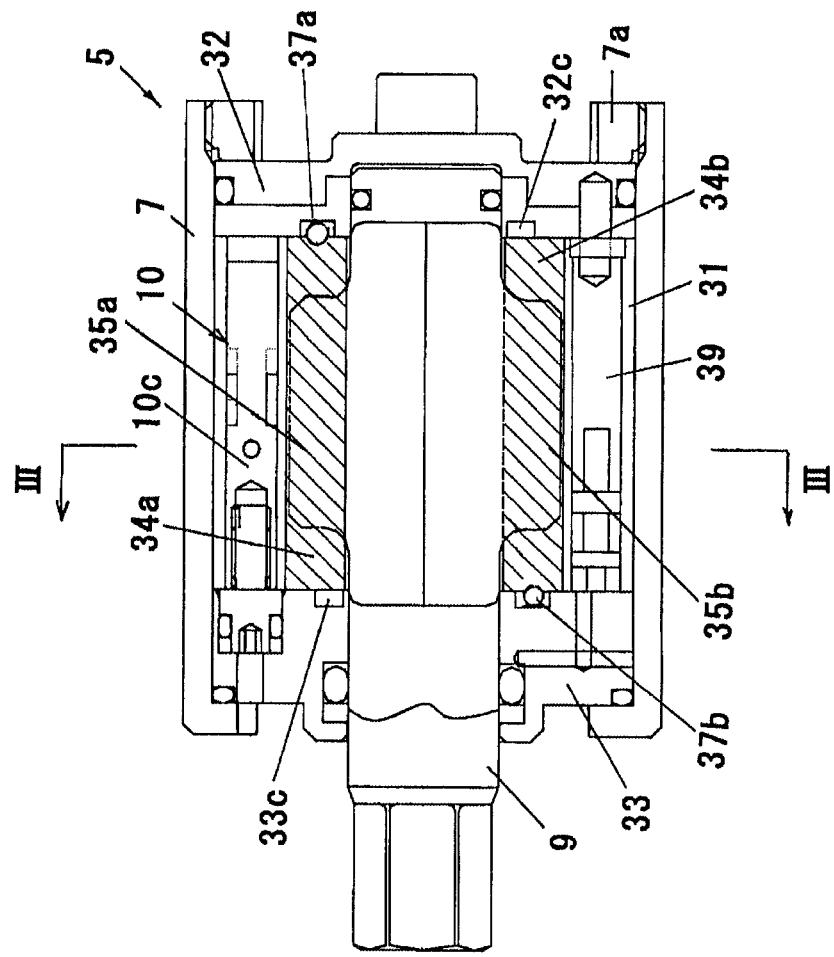
FIG. 13a indicates one embodiment of the impact torque generator for hydraulic torque wrench of this invention, showing the front cross section.
Figure 13B:
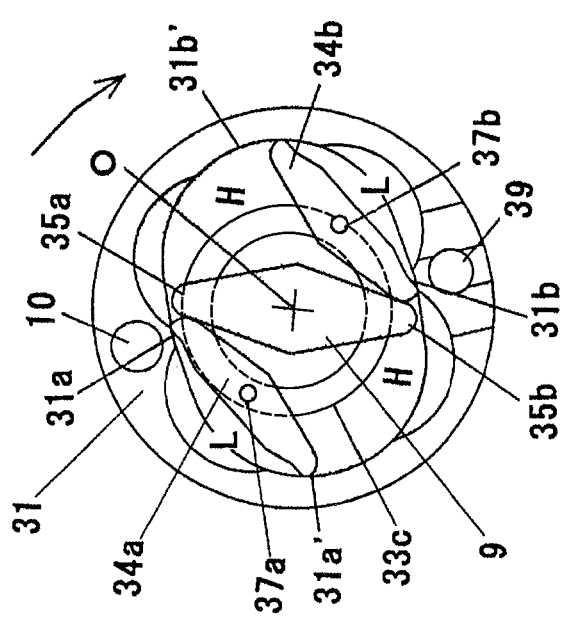
FIG. 13b indicates one embodiment of the impact torque generator for hydraulic torque wrench of this invention, showing its III-III cross section.

The followings explain the implementation configuration of the impact torque generator for hydraulic torque wrench of this invention in accordance with drawings.

FIG. 13a to FIG. 16 show one embodiment of the impact torque generator for hydraulic torque wrench of this invention.

This hydraulic impact torque generator 5 is an improved version of the hydraulic impact torque generator 5 described in FIG. 1a to FIG. 6d and FIG. 7a to FIG. 12d, and it is made simpler in structure, durable, less in sliding resistance, and higher in energy efficiency.

And its basic structure is same as that of the hydraulic impact torque generator 5 described in FIG. 1a to FIG. 6d and FIG. 7a to FIG. 12d, and it has liner 31 in the liner case 7, hydraulic fluid filled and sealed in the liner 31, and main shaft 9 coaxially inserted in the liner 31.

In the liner 31 with the main shaft 9 inserted in it, cavity of approximately elliptical shape is formed, and on its inner peripheral surface, two sealing surfaces 31a and 31b are formed at the position of 180 degree rotational symmetry. This cylindrical liner 31 is supported at outer periphery by the liner case 7, and at both ends of the liner 31, liner upper cover 32 and liner lower cover 33 are arranged, and the liner 31 and liner upper cover 32 and liner lower cover 33 are integrally rotated by inserting knock pin (not illustrated) in the pin hole provided in the liner 31 and pin holes provided in the liner upper cover 32 and liner lower cover 33. And the liner upper cover 32 is further fixed in the axial direction by the liner case cover 7a to seal the hydraulic fluid filled. In the inner surface of the liner upper cover 32 and liner lower cover 33, guide grooves 32c and 33c are formed eccentric to the rotating shaft O of the liner 31 in such a way that the eccentric direction will be 180 degree rotational symmetry. In the inner surface of the liner upper cover 32 and liner lower cover 33, a groove to escape the hydraulic fluid is formed at a prescribed position.

With the hydraulic impact torque generator 5 of this embodiment, unlike the hydraulic impact torque generator 5 described in FIG. 1a to FIG. 6d and FIG. 7a to FIG. 12d, the other sealing surfaces 31a' and 31b' of the couple of sealing surfaces 31a and 31b or the sealing surfaces of the liner 31 corresponding to the sealing surfaces of the driving blades 34a and 34b to be described later are composed of the inner peripheral surfaces of the cavity.

The inner peripheral surface of the cavity of the liner to form these sealing surfaces 31a' and 31b' has an approximately cylindrical shape and the angle θ is 30°~70°, preferably about 40°~60° (50° for this embodiment). By angular sealing surfaces 31a and 31b being made two pieces, it is substantially possible to omit the processing of the cavity of the liner 31 to form the sealing surfaces 31a' and 31b' thus making the structure simple making it possible to provide an impact torque generator for hydraulic torque wrench having durability.

For the main shaft 9 to be coaxially installed inside the liner 31, two projections 35a and 35b with the surface smoothed are formed at the position of 180 degree rotational symmetry. For the two projections 35a and 35b of the main shaft 9, the length in the axial direction and circumferential direction is made shorter than the cavity inside the liner 31 thus forming a passage to flow the hydraulic fluid at both ends in the axial direction and at the end in the circumferential direction.

In the cavity set by the projections 35a and 35b of the main shaft 9, formed inside the liner 31, two driving blades 34a and 34b of same length, approximately triangular in section with the surface smoothed, are inserted. For these two driving blades 34a and 34b, the length in the axial direction is made almost same length as the cavity inside the liner 31 so that the side face of the driving blades 34a and 34b slides in contact with the inner surface of the liner upper cover 32 and liner lower cover 33, and near at both ends of them, sealing surfaces to correspond to the sealing surfaces 31a, 31a', 31b and 31b' of the liner 31 are formed, and on one side face of the driving blades 34a and 34b, steel balls 37a and 37b to be inserted in the grooves 32c and 33c formed in the inner surface of the liner upper cover 32 and liner lower cover 33 are arranged, and the steel ball 37b of the driving blade 34b and steel ball 37a of the driving blade 34a are inserted in the guide groove 32c of the liner upper cover 32 and in the guide groove 33c of the liner lower cover 33, respectively, and when the sealing surfaces 31a, 31a', 31b and 31b' and the sealing surfaces of the driving blades 34a and 34b come to coincide twice per rotation of the liner 31, the movement of the driving blades 34a and 34b is restricted once by the steel balls 37a and 37b of the driving blades 34a and 34b inserted in the guide grooves 32c and 33c formed eccentric to the rotating shaft O of the liner 31 on the inner surface of the liner upper cover 32 and liner lower cover 33, thereby preventing the coincidence and thus generating the impact torque on the main shaft 9 once per rotation of the liner 31.

In place of the steel balls 37a and 37b inserted in the guide grooves 32c and 33c, used in this embodiment to guide and restrict the movement of the driving blades 34a and 34b, it is possible to apply the pins 27a and 27b to be inserted in the guide grooves 22c and 23c to guide and restrict the movement of the driving blades 34a and 34b, used in the hydraulic impact torque generator 5 described in FIG. 7a to FIG. 12d.

Figure 16:
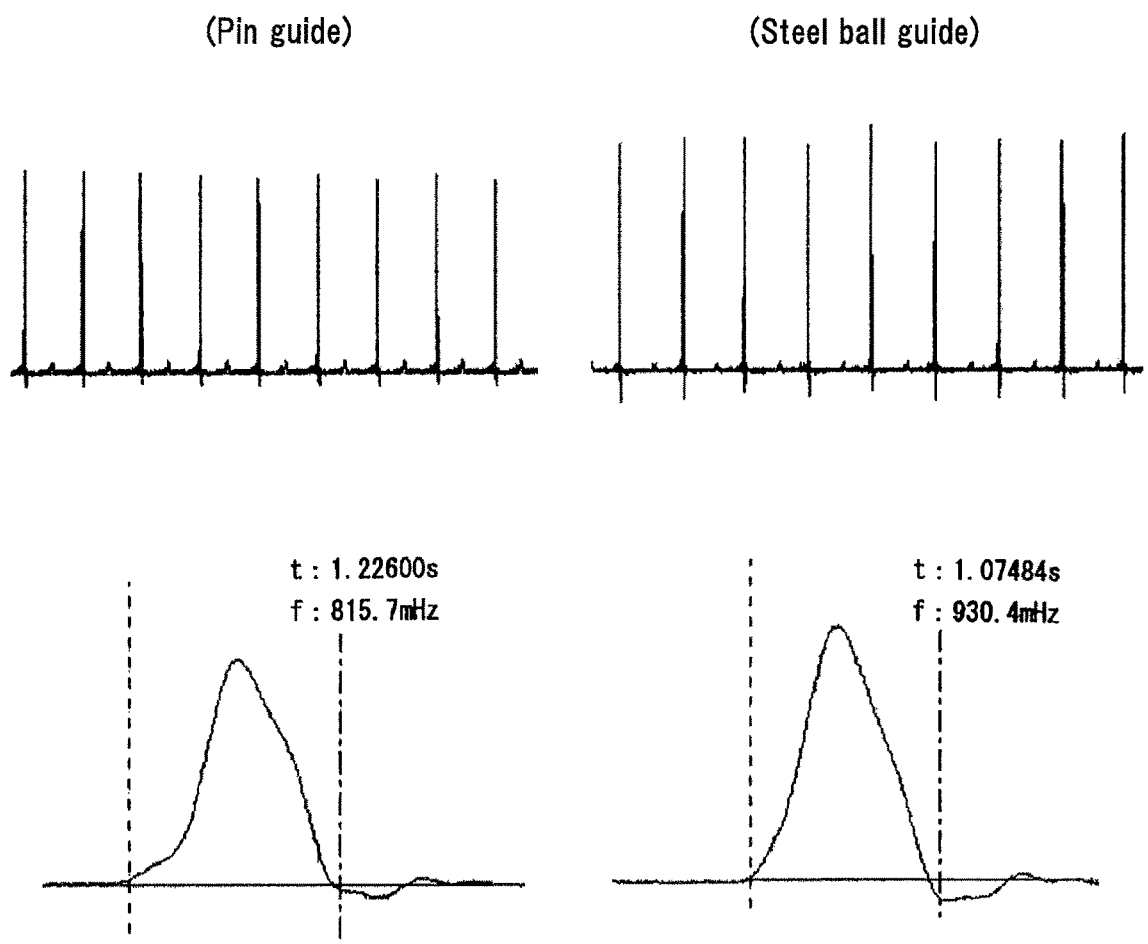
FIG. 16 is a view to show the output and waveform of comparison test by pin and steel ball to restrict the movement of the driving blade.

Table 1 and FIG. 16 show the output (measured values by digital torque tester) and the waveform of the comparison test when pins 27a and 27b and steel balls 37a and 37b are used.

[Table 1]

As clear from the results of the comparison test when pins 27a and 27b and steel balls 37a and 37b are used, it is confirmed that the steel balls 37a and 37b are smaller in sliding resistance and better in energy efficiency in comparison with the pins 27a and 27b.

The sealing surfaces of the driving blades 34a and 34b can be composed, as required, of steel bars 34d arranged in the groove 34c formed at both ends of the driving blade.

This makes it possible to provide an impact torque generator for hydraulic torque wrench, small in sliding resistance and better in energy efficiency.

The outer peripheral surface of the liner 31 is provided with a communicating groove (not illustrated) to mutually connect the cavities to become the low-pressure room L inside the liner 31 which is set by the sealing surfaces 31a, 31a', 31b and 31b' of the driving blades 34a and 34b and the liner 31.

The liner 31 is provided with output adjusting mechanism 10 to adjust the size of the impact torque in parallel with the shaft center of the liner 31. This output adjusting mechanism 10 is conventionally known, and it is composed of ports (not illustrated) to connect the cavities to become high-pressure room H and low-pressure room L inside the liner 31, divided by the driving blades 24a and 24b and the sealing surfaces 31a, 31a', 31b and 31b' and output adjusting valve 10c adjustably and helically fit in tapped hole provided in the liner lower cover 33.

The liner 31 is provided with an accumulator 39 to absorb thermal expansion of the hydraulic fluid in parallel with the shaft center of the liner 31.

The operation of the impact torque generator 5 for hydraulic torque wrench is explained as follows. First by operating the main valve 2 and selector valve 3, high-pressure air is introduced into the rotor room in the main body 1, and then the rotor rotates at high speed. The rotating force of this rotor is transferred to the liner 31.

Figure 14A:
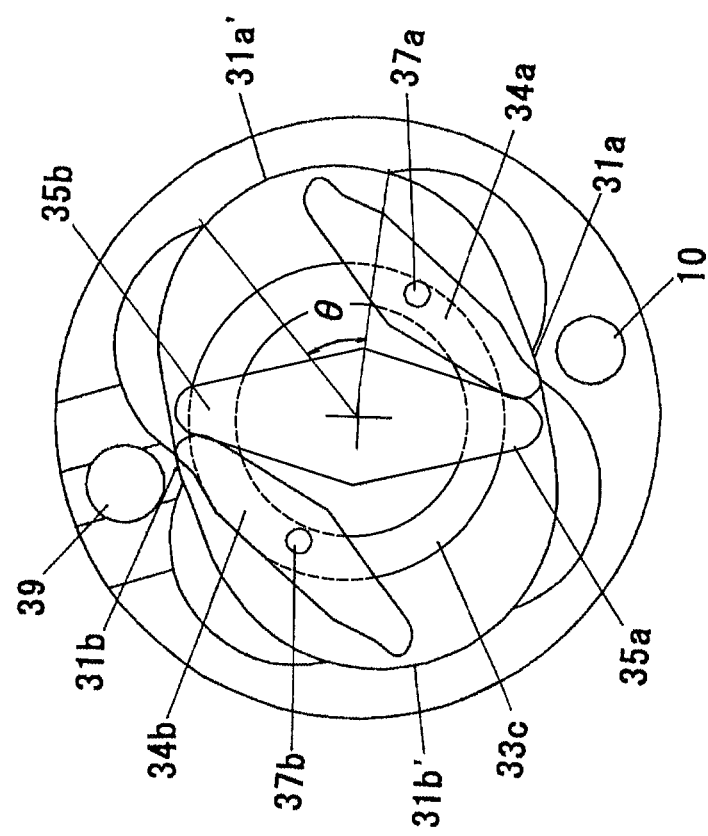
FIG. 14a is a view to show the operation of the impact torque generator of the same embodiment.

By the rotation of the liner 31, the inside of the liner case 7 changes as shown in FIG. 14a→14b→14a. FIG. 14a indicates the state where the impact torque is generated on the main shaft 9, and this makes the liner 31 rotate about 180°, the state shown in FIG. 14b.

The impact torque occurs on the main shaft 9 as shown in FIG. 14a, where the sealing surfaces 31a, 31a', 31b and 31b' of the liner 31 and the sealing surfaces of the driving blades 34a and 34b coincide and the cavity inside the liner 31 is divided into 4 rooms, and because of the shape of the cavity inside the liner 31, the moment when the impact torque occurs on the main shaft 9, the volume on the side of high-pressure room decreases and the volume on the side of low-pressure room L increases, and the rooms become high-pressure room H and low-pressure room L. That is, the liner 31 is rotated by the rotor 4, and when the sealing surfaces 31a, 31a', 31b and 31b' and the sealing surfaces of the driving blades 34a and 34b come to the position of coincidence, the rooms become high-pressure room H and low-pressure room L, and by the driving blades 34a and 34b being pushed to the side of low-pressure room L, the sealing surfaces 31a, 31a', 31b and 31b' and the sealing surfaces of the driving blades 34a and 34b coincide and the cavity inside the liner 31 is completely sealed and via the driving blades 34a and 34b, the rotating force of the liner 31 acts on the projections 35a and 35b of the main shaft 9, thus generating the impact torque on the main shaft 9. And the main shaft 9 is rotated by the impact torque generated intermittently, once per rotation of the liner 31, thus performing such desired work as tightening and loosening bolts and nuts.

Figure 14B:
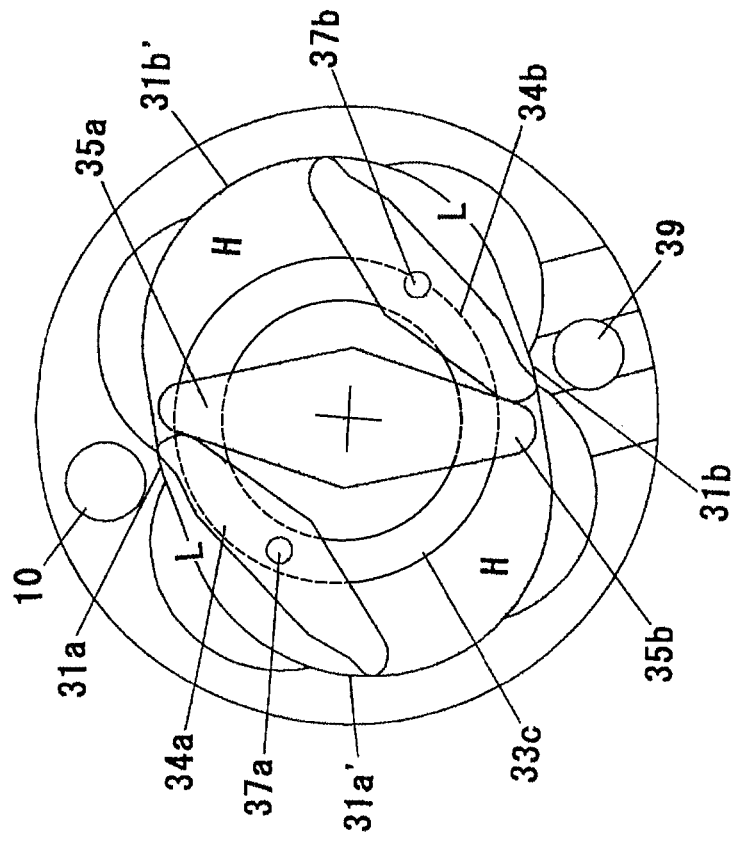
FIG. 14b is a view to show the operation of the impact torque generator of the same embodiment.
Figure 15B:
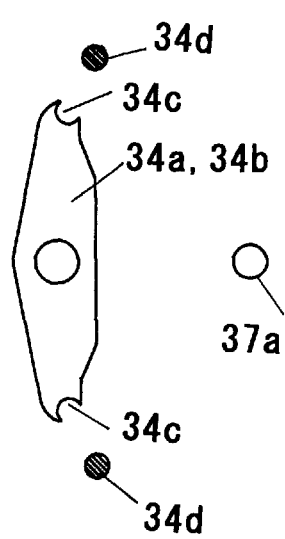
FIG. 15b is an exploded view of the driving blade of the same embodiment, showing the side view.
Figure 15A:
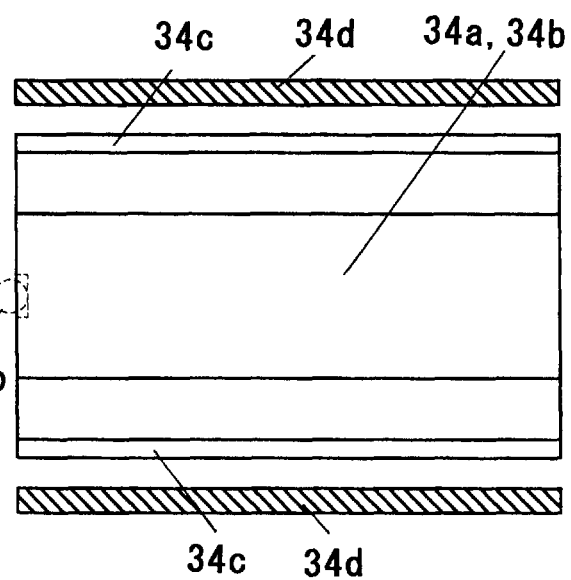
FIG. 15a is an exploded view of the driving blade of the same embodiment, showing the front view.

As shown in FIG. 14b, on the other hand, the sealing surfaces 31a, 31a', 31b and 31b' and the sealing surfaces of the driving blades 34a and 34b come to coincide, but the movement of the driving blades 34a and 34b is restricted by the steel balls 37a and 37b of the driving blades 34a and 35b inserted in the guide grooves 32c and 33c formed eccentric to the rotating shaft O of the liner 31 in the inner surface of the liner upper cover 32 and liner lower cover 33 and the cavity inside the liner 31 is not sealed, and therefore, no impact torque occurs on the main shaft.

As described above, except in FIG. 14a, the sealing surfaces 31a, 31a', 31b and 3b' of the liner 31 and the sealing surfaces of the driving blades 34a and 34b do not coincide and the sealing is not done.

If the rotor is rotated in reversed direction, it is possible to generate the impact torque in reversed direction on the main shaft 9.

Other composition and action of this hydraulic impact torque generator 5 are same as those of the hydraulic impact torque generator 5 described in FIG. 1a to FIG. 6d and FIG. 7a to FIG. 12d.

As the mechanism to generate the impact torque on the main shaft 9 once per rotation of the liner 31, the mechanism disclosed in JP 07-328944 A can be adopted, in addition to the steel balls 37a and 37b inserted in the guide grooves 32c and 33c, to guide and restrict the movement of the driving blades 34a and 34b and the pins 27a and 27b inserted in the guide grooves 22c and 23c to guide and restrict the movement of the driving blades 34a and 34b described in FIG. 7 to FIG. 12 and used in the hydraulic impact torque generator 5.

With this hydraulic impact torque generator 5, because the sliding resistance is small and energy efficiency is good, it is also possible to generate the impact torque on the main shaft 9 twice as per rotation of the liner 31, like the hydraulic impact torque generator 5 described in FIG. 1 to FIG. 6.

By the way, this hydraulic impact torque generator 5 has the above action effect, but there were problems as follow.

(1) When the rotating shaft is used in horizontal direction, the operation of the driving blade is low in stability.

(2) Due to the magnetic powder caused by abrasion of parts included in the hydraulic fluid, the parts are worn and durability of the equipment is deteriorated.

Figure 17A:
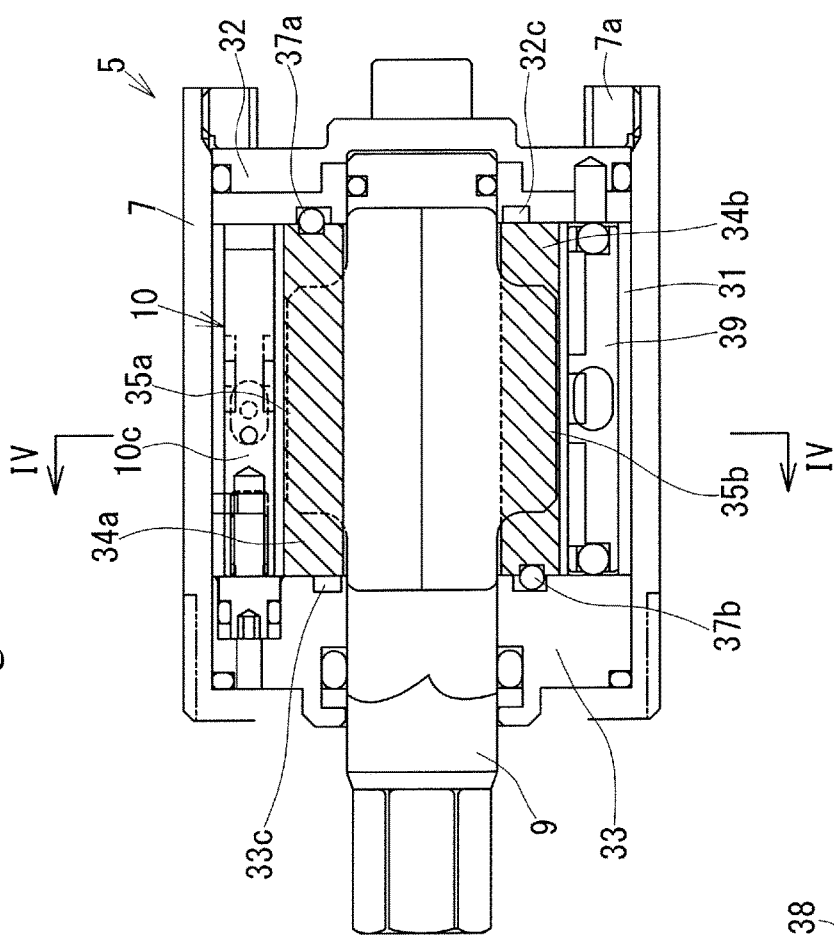
FIG. 17a indicates a modified embodiment of the impact torque generator for hydraulic torque wrench of this invention, showing a front cross section.
Figure 17B:
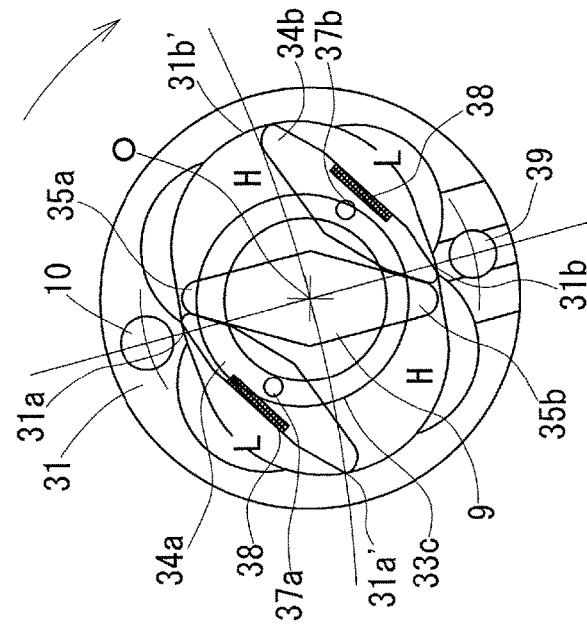
FIG. 17b indicates a modified embodiment of the impact torque generator for hydraulic torque wrench of this invention, showing its IV-IV cross section.

To cope with this problem, FIG. 17 to FIG. show modified embodiments of the impact torque generator for hydraulic torque wrench of this invention.

To cope with the problem (1) above, in this modified embodiment, the cross-sectional shape of the driving blades 34a and 34b are made asymmetrical.

Figure 17C:
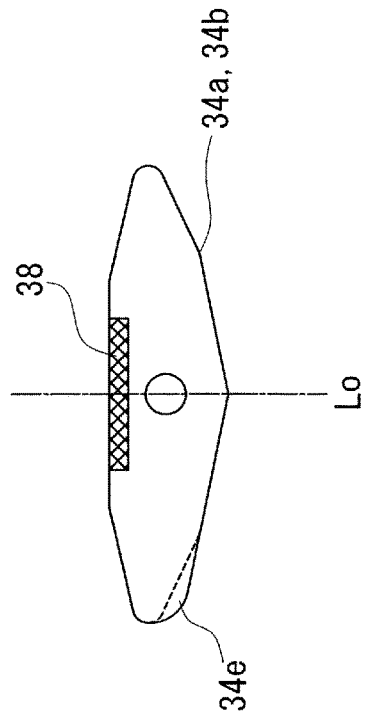
FIG. 17c indicates a modified embodiment of the impact torque generator for hydraulic torque wrench of this invention, showing the side view of driving blade.

To be specific, a swollen portion 34e is formed on the left side of the center line Lo in the cross-sectional shape of the driving blades 34a and 34b, as shown in FIG. 17(c), thereby the volume of the left-side half is made larger than the volume of the right-side half so that the center of gravity will not be positioned on the center line Lo.

This makes it possible to improve the motion of the driving blades 34a and 34b when the rotating shaft is used in the horizontal direction where the motion of the driving blades 34a and 34b is difficult to be stabilized in comparison with the case where the rotating shaft is used in the vertical direction against the horizontal plane, as shown in FIG. 20, thus stable and high output can be obtained.

Then, to cope with the problem (2) above, the driving blades 34a and 34b are magnetized in this modified embodiment.

Figure 18A:
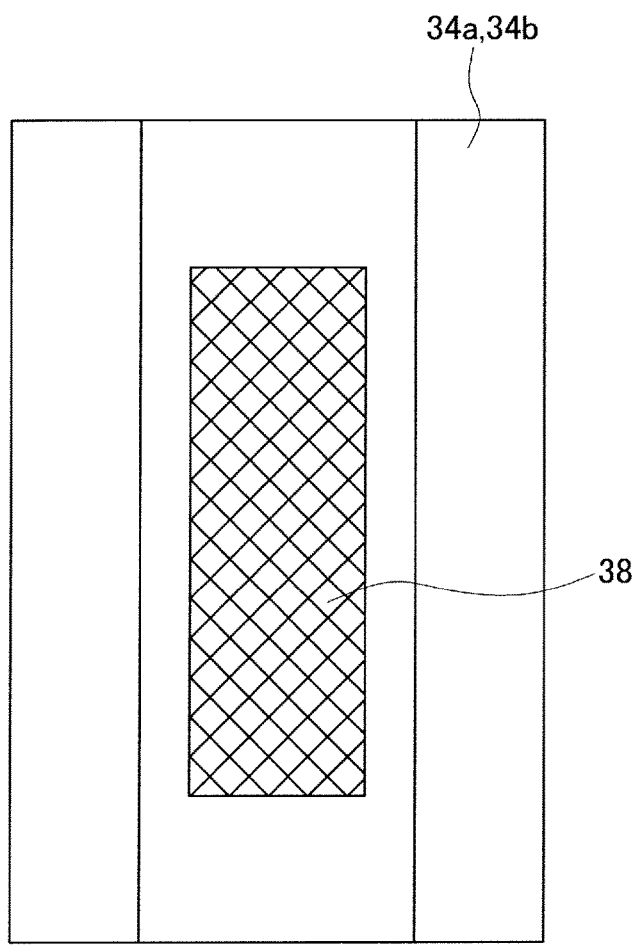
FIG. 18a is an exploded view of the driving blade of the same modified embodiment, showing the front view.
Figure 18C:
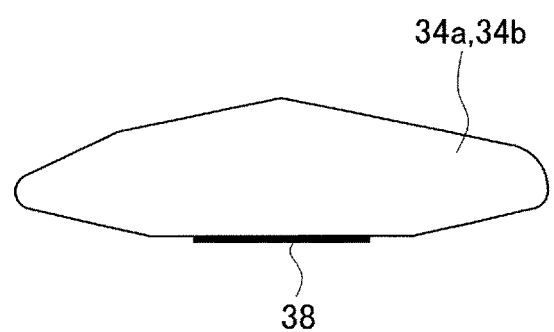
FIG. 18c is an exploded view of the driving blade of the same modified embodiment, showing the side view of a different embodiment.
Figure 18B:
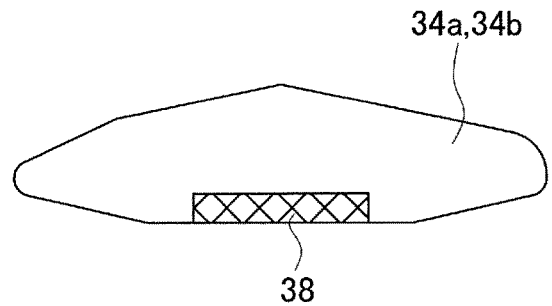
FIG. 18b is an exploded view of the driving blade of the same modified embodiment, showing the side view.
Figure 19A:
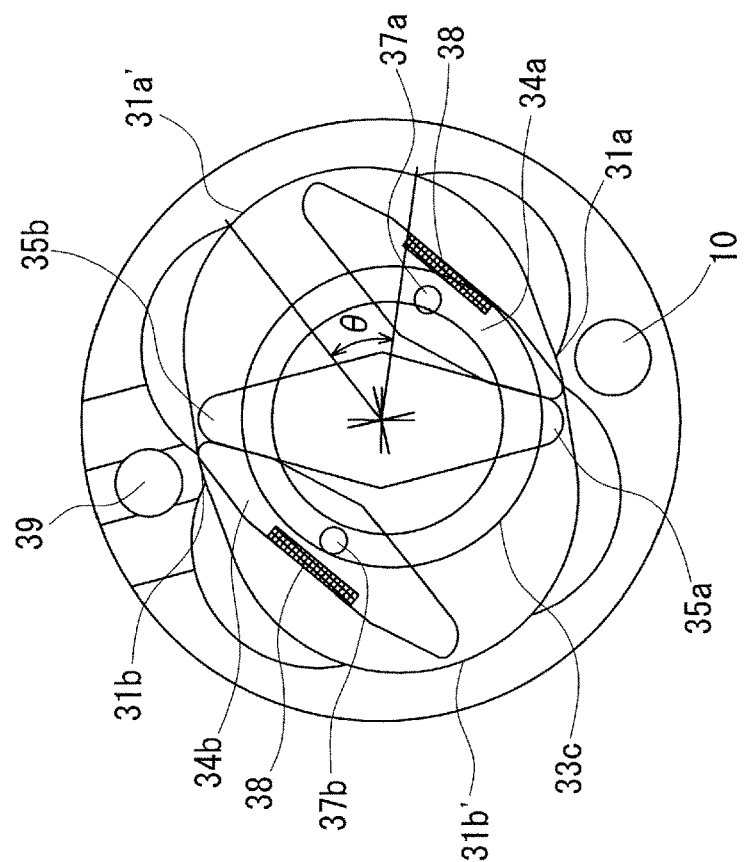
FIG. 19a is a view to show operation of the impact torque generator of the same modified embodiment.
Figure 19B:
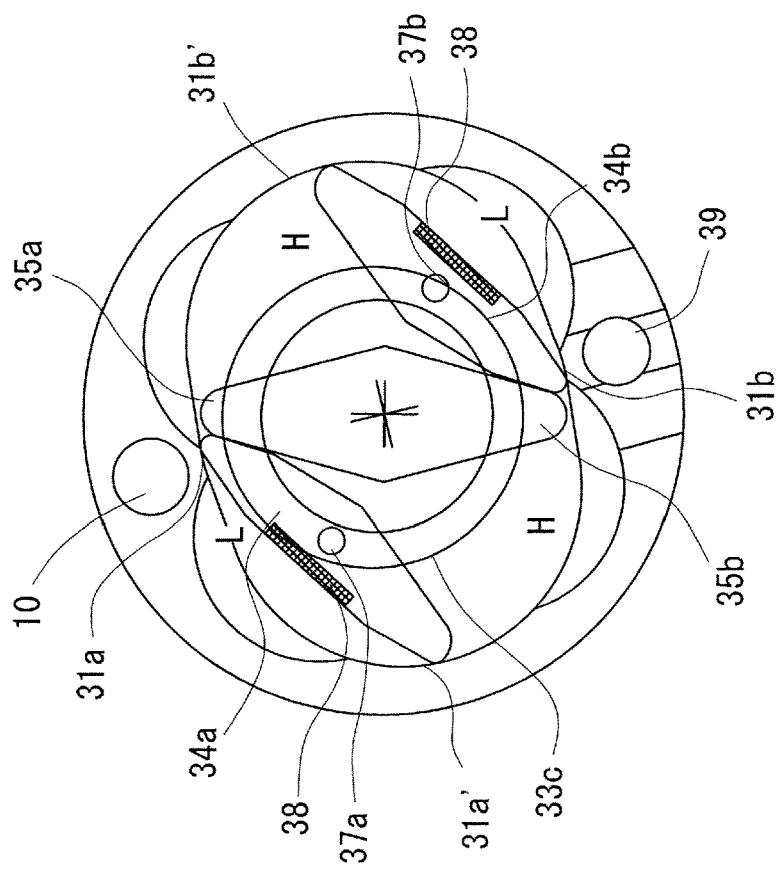
FIG. 19b is a view to show operation of the impact torque generator of the same modified embodiment.
Figure 21:
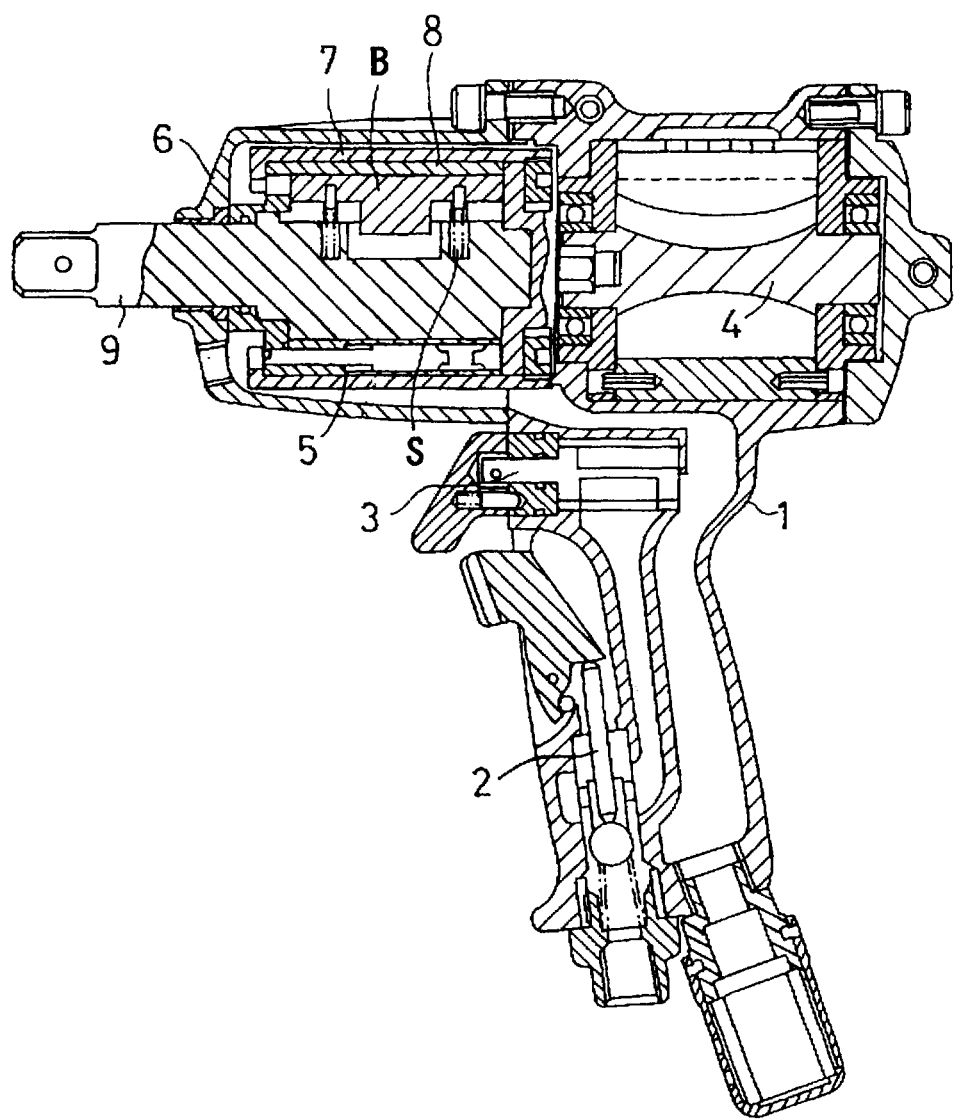
FIG. 21 is a view to show the whole of the hydraulic impact wrench incorporating the conventional impact torque generator.

To be specific, magnet 38 is buried at a place not brought into contact with other members of the driving blades 34a and 34b, as shown in FIGS. 18(a) and (b), or the magnet 38 is attached as shown in FIG. 18(c), and in addition, it is also possible to magnetize the driving blades 34a and 34b themselves.

The size (surface area and thickness) of the magnet 38 can be properly set in accordance with the quantity of the magnetic powder to be adsorbed to the driving blades 34a and 34b.

In this way, it is possible to prevent abrasion of the parts due to the magnetic powder by adsorbing the magnetic powder produced due to the abrasion of the parts included in the hydraulic fluid without being affected by the resistance due to contact with other members and in terms of balance. Also, it is possible to easily remove the magnetic powder adsorbed to the driving blades 34a and 34b by just wiping the driving blades 34a and 34b during maintenance.

Other composition and action of this hydraulic impact torque generator 5 are same as those of the hydraulic impact torque generator 5 described in FIG. 13 to FIG. 16.

The impact torque generator for hydraulic torque wrench of this invention has been explained in accordance with the embodiments but this invention is not limited to the composition described in the above embodiments, and for example, as the motor of drive source, air motor or electric motor can be used, and in addition, the composition can be properly changed within the range not deviated from the object.

[Possibility of Industrial Use]

Since the impact torque generator for hydraulic torque wrench of this invention has such characteristics that it does not require the blade to be always pushed toward the outer peripheral direction of the main shaft by the spring, it is small in sliding resistance, good in energy efficiency, less temperature rise of the hydraulic fluid, stable output can be obtained, it is compact and simple in structure, and durable, it can be suitably used for the hydraulic torque wrench using an electrical motor in which air-cooling effect by high-pressure air of power source cannot be expected and for the hydraulic torque wrench requiring high tightening accuracy, and in addition, for example, it can be used for a hydraulic torque wrench using an air motor.

EXPLANATION OF SIGNS

1 Main body
2 Main valve
3 Normal/reverse rotation selector valve
4 Rotor
5 Impact torque generator
6 Front case
7 Liner case
8 Liner
9 Main shaft
10 Output adjusting mechanism
11 Liner
11a Liner sealing surface
11b Liner sealing surface
12 Liner upper cover
13 Liner lower cover
14a Driving blade
14b Driving blade
15a Projection of main shaft
15b Projection of main shaft
16 Communicating groove
17 Knock pin
21 Liner
21a Liner sealing surface
21b Liner sealing surface
22 Liner upper cover
22c Guide groove
23 Liner lower cover
23c Guide groove
24a Driving blade
24b Driving blade
25a Projection of main shaft
25b Projection of main shaft
26 Communicating groove
27a Pin
27b Pin
29 Accumulator
31 Liner
31a Liner sealing surface
31a' Liner sealing surface
31b Liner sealing surface
31b' Liner sealing surface
32 Liner upper cover
32c Guide groove
33 Liner lower cover
33c Guide groove
34a Driving blade
34b Driving blade
34c Groove
34d Steel bar
34e Swollen portion
35a Projection of main shaft
35b Projection of main shaft
37a Steel ball
37b Steel ball
38 Magnet
39 Accumulator
H High-pressure room
L Low-pressure room
Lo Center line
S Spring

The invention claimed is:

1. An impact torque generator for a hydraulic torque wrench, the impact torque generator comprising:
   a liner;
   a main shaft;
   a first drivable blade; and
   a second drivable blade,
   wherein:
   the liner is configured to be rotated by a rotor;
   the liner includes a cavity to be filled with hydraulic fluid;
   the liner includes sealing surfaces projecting from an inner peripheral surface of the liner which is adjacent to the cavity;
   the main shaft has two projections coaxially positioned inside the liner;

the first drivable blade is positioned in the cavity;

the first drivable blade has a first sealing surface at a first end of the first drivable blade and a second sealing surface at a second end of the first drivable blade;

a cross-sectional shape of the first drivable blade is asymmetrical on both sides of a center line of the first drivable blade which intersects longitudinal sides of the first drivable blade;

the second drivable blade is positioned in the cavity;

the second drivable blade has a first sealing surface at a first end of the second drivable blade and a second sealing surface at a second end of the second drivable blade;

a cross-sectional shape of the second drivable blade is asymmetrical on both sides of a center line of the second drivable blade which intersects longitudinal sides of the second drivable blade;

the sealing surfaces of the liner are positioned so as to have 180 degree rotational symmetry across the cavity;

the first sealing surface of the first drivable blade is configured to be in contact with a first of the sealing surfaces of the liner while the second sealing surface of the first drivable blade slides in contact with the inner peripheral surface of the liner so as to create a first seal such that a first portion of an interior of the liner is divided into a first high-pressure chamber and a first low-pressure chamber so as to generate impact torque on the main shaft; and the first sealing surface of the second drivable blade is configured to be in contact with a second of the sealing surfaces of the liner while the second sealing surface of the second drivable blade slides in contact with the inner peripheral surface of the liner so as to create a second seal such that a second portion of the interior of the liner is divided into a second high-pressure chamber and a second low-pressure chamber so as to generate impact torque on the main shaft.

2. The impact torque generator of claim 1, wherein:

the liner includes a liner lower cover and a liner upper cover;

a first guide groove is defined in the liner lower cover;

a second guide groove is defined in the liner upper cover; and a first steel ball is arranged on a side face of the first drivable blade and in the first guide groove so as to restrict movement of the first drivable blade and a second steel ball is arranged on a side face of the second drivable blade and in the second guide groove so as to restrict movement of the second drivable blade, thereby causing the impact torque to occur once per rotation of the liner.

3. The impact torque generator of claim 1, wherein:

the first drivable blade has a first groove at the first end of the first drivable blade and a second groove at the second end of the first drivable blade;

the first drivable blade has a first steel bar in the first groove of the first drivable blade and a second steel bar in the second groove of the first drivable blade;

the second drivable blade has a first groove at the first end of the second drivable blade and a second groove at the second end of the second drivable blade;

the second drivable blade has a first steel bar in the first groove of the second drivable blade and a second steel bar in the second groove of the second drivable blade.

4. The impact torque generator of claim 1, wherein each of the first drivable blade and the second drivable blade includes a magnet.

5. The impact torque generator of claim 1, wherein:

the first drivable blade includes a swollen portion on a first side of the first drivable blade whereby a volume of a first-side half of the first drivable blade is larger than a volume of a second-side half of the first drivable blade such that a center of gravity of the first drivable blade is not positioned on the center line of the first drivable blade which intersects the longitudinal sides of the first drivable blade; and the second drivable blade includes a swollen portion on a first side of the second drivable blade whereby a volume of a first-side half of the second drivable blade is larger than a volume of a second-side half of the second drivable blade such that a center of gravity of the second drivable blade is not positioned on the center line of the second drivable blade which intersects the longitudinal sides of the second drivable blade.

* * * * *